Figures 1, 2, 3:
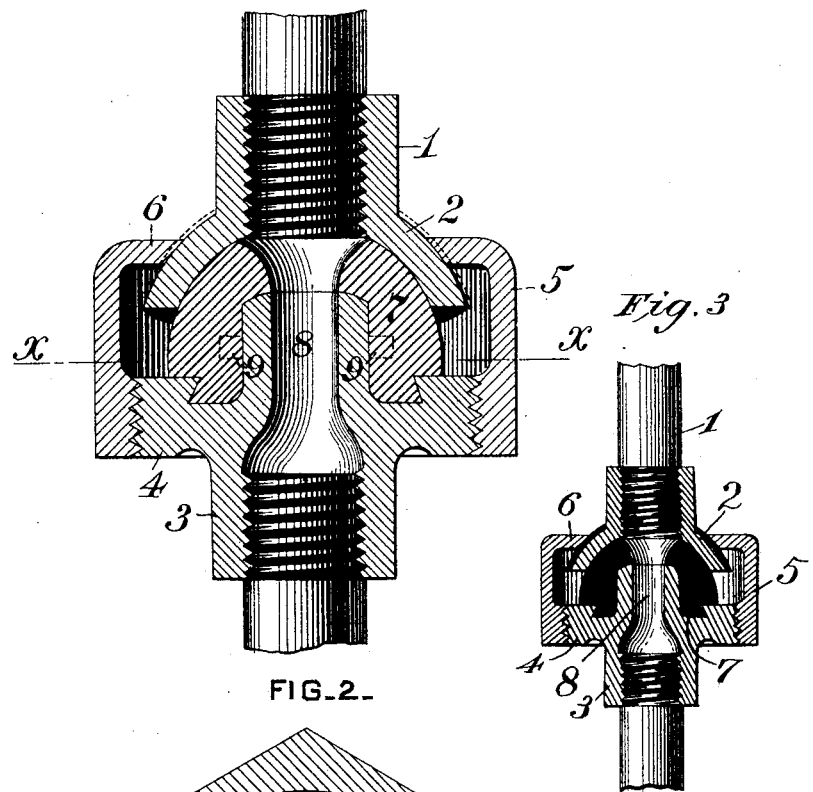

(No Model.)

R. HERMAN.
PIPE COUPLING.

No. 482,922. Patented Sept. 20, 1892.

WITNESSES:
Darwin S. Wolcott
F. E. Gaither

INVENTOR,
Reinhold Herman
by George H. Christy
Att'y

UNITED STATES PATENT OFFICE.

REINHOLD HERMAN, OF CRAFTON, PENNSYLVANIA.

PIPE-COUPLING.

SPECIFICATION forming part of Letters Patent No. 482,922, dated September 20, 1892.

Application filed November 27, 1891. Serial No. 413,252. (No model.)

*To all whom it may concern:*

Be it known that I, REINHOLD HERMAN, a citizen of the United States, residing at Crafton, in the county of Allegheny and State of Pennsylvania, have invented or discovered a certain new and useful Improvement in Pipe-Couplings, of which improvement the following is a specification.

The invention described herein relates to certain improvements in couplings for pipes, and has for its object a construction whereby the adjacent ends of two sections or lines of pipe may be easily connected, even when such sections or lines of pipe are at an angle to each other or somewhat out of line.

In general terms the invention consists in the construction and combination substantially as hereinafter more fully described and particularly claimed.

In the accompanying drawings, forming a part of this specification, Figure 1 is a sectional elevation of my improved coupling. Fig. 2 is a sectional plan view of the same; and Fig. 3 is a view similar to Fig. 1, showing an insulating-joint embodying my invention.

My improved coupling consists of three parts or members—to wit, two male parts and the coupling-sleeve. One of the male parts consists of an internally-threaded tube 1, having a concavo-convex flange 2 on its inner end, as shown in Fig. 1. The other male part consists of an internally-threaded tube 3, provided at its inner end with a flange 4, having a threaded perimeter. These two parts are connected by a sleeve 5, having at one end an inwardly-turned rim 6, adapted to bear upon the outer face of the concavo-convex flange 2, while its opposite end is internally threaded for engagement with the threaded flange 4, thereby connecting the two male parts of the coupling. When the two male parts of the coupling are drawn toward each other, the inner concave face of the flange 2 is caused to bear firmly against the convex face of the packing-block 7. This block is preferably made of soft material, as lead, and in the manufacture is cast or otherwise placed around a nipple 8, formed on the inner end of the tube 3. This nipple serves as an inner brace for the packing-block, preventing its being closed in by the pressure of the flange 2 thereon. In order to prevent a displacement of the packing-block, an undercut recess is formed in the inner face of the flange 4 for the reception of a correspondingly-shaped projection on the packing-block, or the packing-block may be held in place by rib 9, formed on the nipple 8, as indicated by dotted lines in Fig. 1.

When my improved coupling is employed for connecting combination electric-light and gas fixtures to the supply-pipes, the packing-block is formed of or faced with some suitable insulating material and the outer face of the concavo-convex flange 2 is covered with insulating material, as indicated in Fig. 3, thereby insulating the two male parts from each other.

I claim herein as my invention—

1. In a pipe-coupling, the combination of two internally-threaded tubes, one provided with a concavo-convex flange and the other provided with a flange having a threaded perimeter, and a packing-block having a convex bearing-surface supported by a thimble formed integral with the tube and flange, and an internally-threaded sleeve provided with an inwardly-projecting flange, substantially as set forth.

2. In a pipe-coupling, the combination of two internally-threaded tubes, one provided with a concavo-convex flange and the other provided with a flange having a threaded perimeter, and a packing-block having a convex bearing-surface supported by a thimble formed integral with the tube and flange, and an internally-threaded sleeve provided with an inwardly-projecting rim, the sleeve and one of the tubes being insulated from the other tube, substantially as set forth.

In testimony whereof I have hereunto set my hand.

REINHOLD HERMAN.

Witnesses:
R. H. WHITTLESEY,
DARWIN S. WOLCOTT.